(No Model.)
O. B. SHALLENBERGER.
METER FOR ALTERNATING ELECTRIC CURRENTS.
No. 414,595. Patented Nov. 5, 1889.
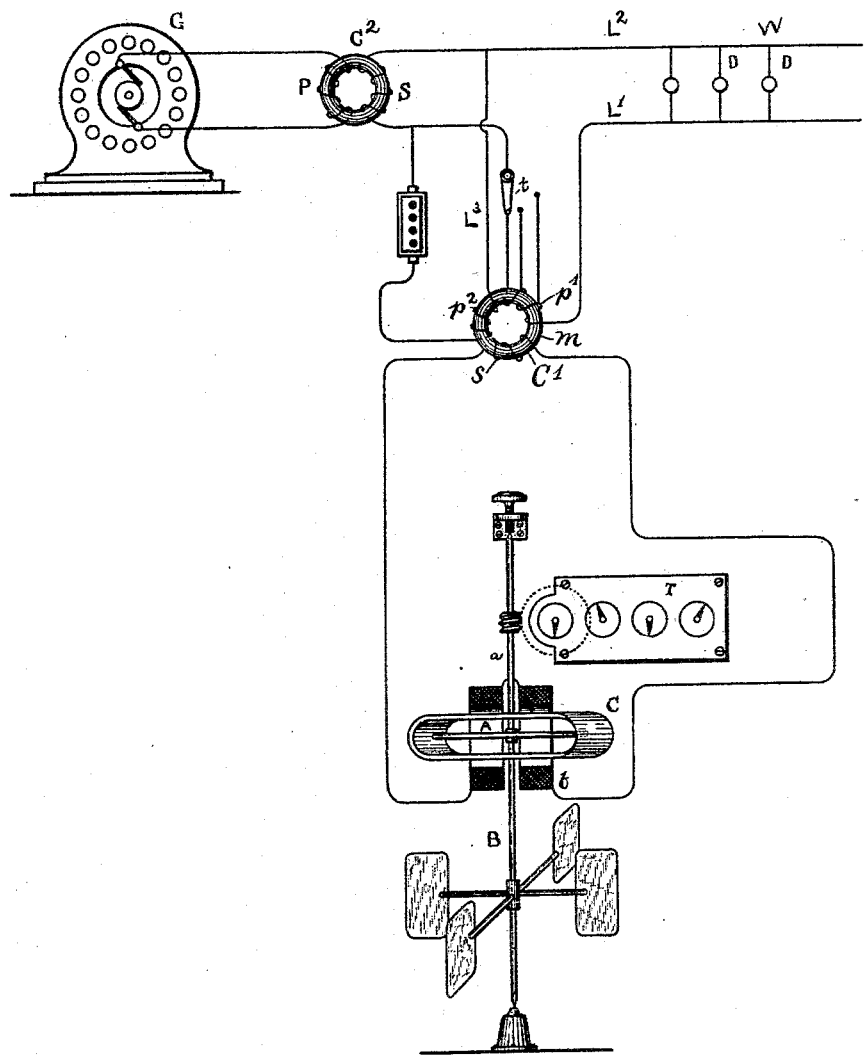
WITNESSES:
George Brown Jr
W L McCullough
INVENTOR
Oliver B. Shallenberger.
BY
Pope Edgecomb & Terry
ATTORNEY

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

METER FOR ALTERNATING ELECTRIC CURRENTS.

SPECIFICATION forming part of Letters Patent No. 414,595, dated November 5, 1889.

Application filed September 8, 1888. Serial No. 234,895. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Meters for Alternating Electric Currents, (Case 229,) of which the following is a specification.

The invention relates to the construction and organization of apparatus for measuring alternating electric currents.

The object of the invention is to render a meter for alternating electric currents capable of measuring accurately the consumption of either large or small amounts of current, and to start readily under the influence of very small currents. Thus, for instance, if a meter is constructed to measure the current supplied to, say, fifty or sixty incandescent lamps, it should also start readily and measure accurately the current supplied to one lamp alone.

In carrying out the invention current is supplied to the meter through a converter. The primary coil of the converter is connected in series with the work-circuit or of the primary coil of a converter supplying the work-circuit. This coil is therefore traversed either by the current supplied to the work-circuit or by a current proportionate thereto. The secondary coil of the converter is connected with the meter. The primary coil has an effect upon the secondary proportionate to the amount of current being used and varying therewith. The converter may be further provided with a second primary coil, which is connected in shunt upon the work-circuit and assists, in effect, the first-named primary coil. This shunt-coil is traversed by a current dependent upon the difference of potential upon the circuit, and in a constant potential system. Therefore it has a constant effect upon the secondary. When employed upon a circuit of constant electro-motive force, the shunt primary coil is designed to have a small constant effect, an artificial resistance being employed, if necessary, to diminish the current flowing through it to such an extent that when no current is flowing in the series primary coil the meter will not register; but as soon as any current flows to the work-circuit the additional effect produced upon the secondary coil will be sufficient to cause the meter to start. In the case of a variable electro-motive force the shunt and series coils may be used in connection with a Watt meter, or with a constant-current circuit the series-coil may have small effect, the registering of the meter being dependent upon the electro-motive force—i. e., the number of devices operated on a series circuit included by the shunt-coil. In the case, however, of either a constant potential or a constant-current circuit, the supplemental coil, the shunt or series coil, as the case may be, serves, in addition to overcoming the friction of the meter and registering device, to compensate for the loss due to conversion from one circuit to another. The potential of the current may or may not be changed in this converter.

The invention will be more particularly described in connection with the accompanying drawing, which is a diagram showing the general organization of the parts in connection with a meter of the general character described in certain Letters Patent issued to me August 14, 1888, Nos. 388,003 and 388,004. It will be understood, however, that the application of the invention is not confined to such a meter; but it is applicable to various other forms of volt-meters and also to ammeters.

Referring to the drawing, G represents a suitable source of alternating, intermittent, or undulatory electric currents. The currents from this source are delivered in any suitable manner to a work-circuit W. This circuit may, if it is desired, be supplied through an electric converter $C^2$, the primary coil P of which is included in the circuit of the generator, while the secondary coil S has its terminals connected with the conductors $L'$ $L^2$, leading to the work-circuit, in which are connected translating devices, such as incandescent electric lamps G D.

The meter measuring the currents supplied to the translating devices is represented at B. In this instance it consists of a disk or ring of magnetizable material A, surrounded by a coil b of insulated wire, adapted to be connected in an electric circuit, and by a second closed circuit C, the axis of which is placed at an angle with reference to that of the coil $b$. The disk is mounted upon an axis $a$, which permits it to revolve under the influence of the lines of polarization established by the alternating currents caused to traverse the coil $b$, and by the induced current in the closed circuit C, the phases of these currents succeeding each other in a manner more fully set forth in the patents referred to. The revolutions of the axis $a$ are recorded in any convenient manner—as, for instance, by a registering-train T.

This meter has its coil $b$ connected in the secondary circuit $s$ of a converter C'. This converter is provided with two primary coils $p'$ $p^2$. The former of these is connected in series with the translating devices D D, it being interposed in the conductor L'. All the current, therefore, which passes to the translating devices traverses this coil $p'$, and a corresponding effect is produced, through the core $m$ of the converter, upon the secondary coil $s$, and a current is thus caused to traverse the coil $b$ proportional to and dependent upon the current delivered to the work-circuit W. It is evident that a certain amount of energy is required to overcome the inertia and friction of the meter and to cause it to start from a position of rest, and also a certain loss is incurred in the converter C' by translating from one circuit to the other. When but one or two lamps are connected in circuit, it is possible that the meter will not start readily from the position of rest. The second coil $p^2$ is therefore provided. This is wound and connected in such manner as to assist the coil $p'$, and always induces in the secondary $s$ a current sufficient to place the meter in readiness to start upon the slightest increase of current in the coil $b$. The coil $p^2$, in the case of a constant potential circuit, is connected in shunt upon the work-circuit, being included in the conductor $L^3$, which leads from the conductor L' to the conductor $L^2$. The difference of potential between these conductors is supposed to be maintained approximately constant, and therefore a constant current will traverse the shunt-coil $p^2$; but so long as no current is traversing the series coil $p'$ the meter will not operate. When the meter is in operation, the assisting-coil $p^2$ compensates also for the loss in conversion. A resistance R may be included in the conductor $L^3$ for the purpose of reducing the current which shall traverse the coil $p^2$.

In manufacturing the meters it is convenient to construct them all upon the same pattern, whether they are to be used in circuits carrying large or small loads. This can be done by applying to the meter a converter the ratio of conversion of which shall be such as to adapt it to the particular circuit upon which it is to be used; or the length of one of the coils of the converter may be made adjustable, whereby it may be adapted at any time to any given circuit. Thus in the drawings there is shown in connection with the coil $p'$ a switch $t$, adapted to include a greater or less length of the coil in circuit. It is evident that by shortening the active length of the coil $p'$ a given current traversing it generates a correspondingly-smaller current in the secondary coil connected to the meter, and in this way the capacity may be increased as required. By properly calibrating and grading the meter it may in this manner be adapted to any amount of work.

I claim as my invention—

1. The combination of an electric meter for alternating electric currents and a converter through which currents are supplied thereto, having a series primary coil and an assisting shunt primary coil, and a secondary coil connected with the meter.

2. The combination, with a meter for alternating electric currents, of a converter having assisting primary coils the length of one of which is adjustable, and a secondary coil connected with the meter.

3. The combination, with an electric meter for alternating electric currents, of an electric converter having its secondary coil connected with said meter and its primary coil adapted to be connected in series with the circuit-supplying translating devices, and a second primary coil adapted to be connected in shunt upon such circuit and assisting the first primary coil.

4. The combination, with an electric meter for alternating electric currents, of an electric converter having its secondary coil connected with said meter and its primary coil adapted to be connected in series with the work-circuit, and an assisting primary coil adapted to be connected in shunt upon such work-circuit, and an adjustable artificial resistance in circuit with said shunt-coil.

5. An electric meter for alternating electric currents, consisting of a rotating armature, an inducing-circuit polarizing the same when traversed by alternating electric impulses, a magnetic medium acted upon by the same current and establishing a line of polarization intersecting the first line, a counting, registering, or indicating device actuated by the movements of the armature, and an electric converter having its secondary coil connected through said inducing-circuit and having two primary coils, one of which is adapted to be connected in series with the circuit supplying a system of distribution and the other adapted to be connected in shunt upon said circuit.

In testimony whereof I have hereunto subscribed my name this 7th day of September, A. D. 1888.

OLIVER B. SHALLENBERGER.

Witnesses:
CHARLES A. TERRY,
C. C. WOLFE.